United States Patent [19]

Johnson

[11] 4,337,620
[45] Jul. 6, 1982

[54] LOAD SENSING HYDRAULIC SYSTEM

[75] Inventor: Oliver W. Johnson, Chaska, Minn.

[73] Assignee: Eaton Corporation, Cleveland, Ohio

[21] Appl. No.: 169,002

[22] Filed: Jul. 15, 1980

[51] Int. Cl.³ ................... F15B 1/02; G05D 11/03
[52] U.S. Cl. ................................ 60/418; 60/421;
   60/422; 60/426; 60/430; 91/516; 91/517;
   91/518; 91/532; 137/101; 137/114
[58] Field of Search ............... 137/101, 114; 91/516,
   91/517, 518, 532; 60/413, 421, 422, 426, 430, 418

[56]  References Cited
  U.S. PATENT DOCUMENTS

| 3,279,558 | 10/1966 | Allen et al. | 180/79.2 |
| 3,455,210 | 7/1969 | Allen | 137/117 |
| 3,463,261 | 8/1969 | Runkle et al. | 180/79.2 |
| 3,952,511 | 4/1976 | Turner | 60/430 |
| 4,002,220 | 1/1977 | Wible | 60/422 |
| 4,015,681 | 4/1977 | Shore et al. | 60/405 |
| 4,044,786 | 8/1977 | Yip | 60/422 |
| 4,192,337 | 3/1980 | Alderson et al. | 137/101 |

*Primary Examiner*—H. Jay Spiegel

*Attorney, Agent, or Firm*—C. H. Grace; L. J. Kasper

[57] ABSTRACT

A system is disclosed for controlling the flow of fluid from a pair of pumps (15,15') to a steering system (11) and a pair of auxiliary load circuits (13,13'). The steering system includes valving (43) defining a variable flow control orifice (45), and the steering system normally operates with a pressure differential X across the variable orifice, and provides load pressure signals (47,49,49',53,53') representative of demand for fluid by the steering system. Fluid flow from the pumps is controlled by a pair of priority flow control valves (21,21') including a pair of valve members (27,27') each of which is biased by a spring (29,29') toward a position permitting flow to the steering system. The spring (29) exerts a biasing force equivalent to the pressure differential X while the spring (29') exerts a biasing force equivalent to a pressure differential Y, which is less than X. When the output of the pump (15) is unable to maintain the pressure differential X across the flow control orifice, the differential across the orifice drops to Y, at which point the valve member (27') is biased by the spring (29') to permit flow from the pump (15') to the steering system.

11 Claims, 4 Drawing Figures

LOAD SENSING HYDRAULIC SYSTEM

BACKGROUND OF THE DISCLOSURE

The present invention relates to a system for providing pressurized fluid to a plurality of load circuits, and more particularly, to such a system in which one of the load circuits must be given "priority", i.e., the full demand for fluid by that circuit must be satisfied, with any excess flow available going to an auxiliary circuit.

Although the system of the present invention is equally adapted to any arrangement in which pressurized fluid is provided to a priority load circuit and an auxiliary load circuit, its use is especially advantageous in arrangements in which the priority load circuit comprises a vehicle hydrostatic power steering system, and the invention will be described in connection therewith.

It is known in the prior art to provide pressurized fluid to both a priority load circuit and an auxiliary load circuit by means of a single fluid source and a single priority flow control valve. See U.S. Pat. No. 3,455,210, assigned to the assignee of the present invention. It is also known in the prior art to provide pressurized fluid to both a priority load circuit and an auxiliary load circuit by means of a pair of fluid sources and some type of valving arrangement which typically directs all of the flow from the primary source to the priority load circuit, while directing fluid from the secondary source to the priority load circuit, only as needed. There is growing interest in systems of this type because of the trend toward requiring full fluid-linked hydrostatic steering systems to have some form of emergency steering capability, for example, in the event the primary fluid source fails.

One of the problems associated with dual pump systems of the type referred to previously is that the valving arrangement needed to "phase in" the flow of fluid from the secondary source to the priority circuit typically is specially designed for the particular application, and is fairly complex. Therefore, because the quantity of any one design of such a valving arrangement is generally small, the manufacturing cost per unit is quite high. In addition, such specially designed valving arrangements provide little flexibility in overall system design.

SUMMARY OF THE INVENTION

Accordingly, it is an object of the present invention to provide a system of the type described including a valving arrangement operable to phase in flow from the secondary source to the priority load circuit when the primary source is unable to satisfy the fluid demand of the priority circuit, while directing all excess fluid to the auxiliary load circuit means.

It is another object of the present invention to provide a system of the type described in which the valving arrangement may comprise a combination of standard, commercially available flow control valves, rather than a valve assembly which is specially designed for the particular application.

The above and other objects of the present invention are accomplished by the provision of an improved system for controlling the flow of fluid from first and second fluid sources to a priority load circuit and to an auxiliary load circuit means. The priority load circuit includes means defining a main, variable flow control orifice and is normally operable with a predetermined pressure differential X across the variable orifice. The priority load circuit includes means providing load pressure signal means representative of the demand for fluid flow by the priority circuit. The system comprises first flow control valve means including an inlet port in fluid communication with the first fluid source, a priority outlet port in fluid communication with the priority circuit, an excess flow outlet port in communication with the auxiliary load circuit means, and a valve member movable between one position permitting unrestricted communication from the inlet to the priority outlet, and another position permitting unrestricted communication from the inlet to the excess flow port. The valve includes means biasing the movable valve member toward the one position, the biasing means exerting a force equivalent to the pressure differential X. The movable valve member is biased toward the another position by the load pressure signal means. The system includes a second flow control valve means including an inlet port in communication with the second source, a priority outlet port in fluid communication with the priority circuit, and a valve member movable between one position permitting unrestricted communication between the inlet and the priority outlet, and another position preventing fluid communication from the inlet to the priority outlet. The valve includes means biasing the valve member toward the one position, the biasing means exerting a force equivalent to a pressure differential Y. The movable valve member is biased toward the another position by the load pressure signal means. The pressure differential Y is less than the pressure differential X whereby, when the fluid delivery of the first source is sufficient to maintain the pressure differential X across the main variable orifice, the valve member of the second flow control valve is in the another position, and all fluid required by the priority circuit is supplied by the first source. However, when the fluid delivery of the first source is insufficient to maintain the differential X, the differential across the main variable orifice is reduced to the pressure differential Y, and the movable valve member of the first flow control valve is in the one position so that the entire fluid delivery of the first source flows to the priority circuit. The valve member of the second flow control valve is biased away from the another position to permit a sufficient flow from the second source to the priority circuit to maintain the pressure differential Y across the main variable orifice.

DESCRIPTION OF THE PREFERRED EMBODIMENTS

Figure 1:
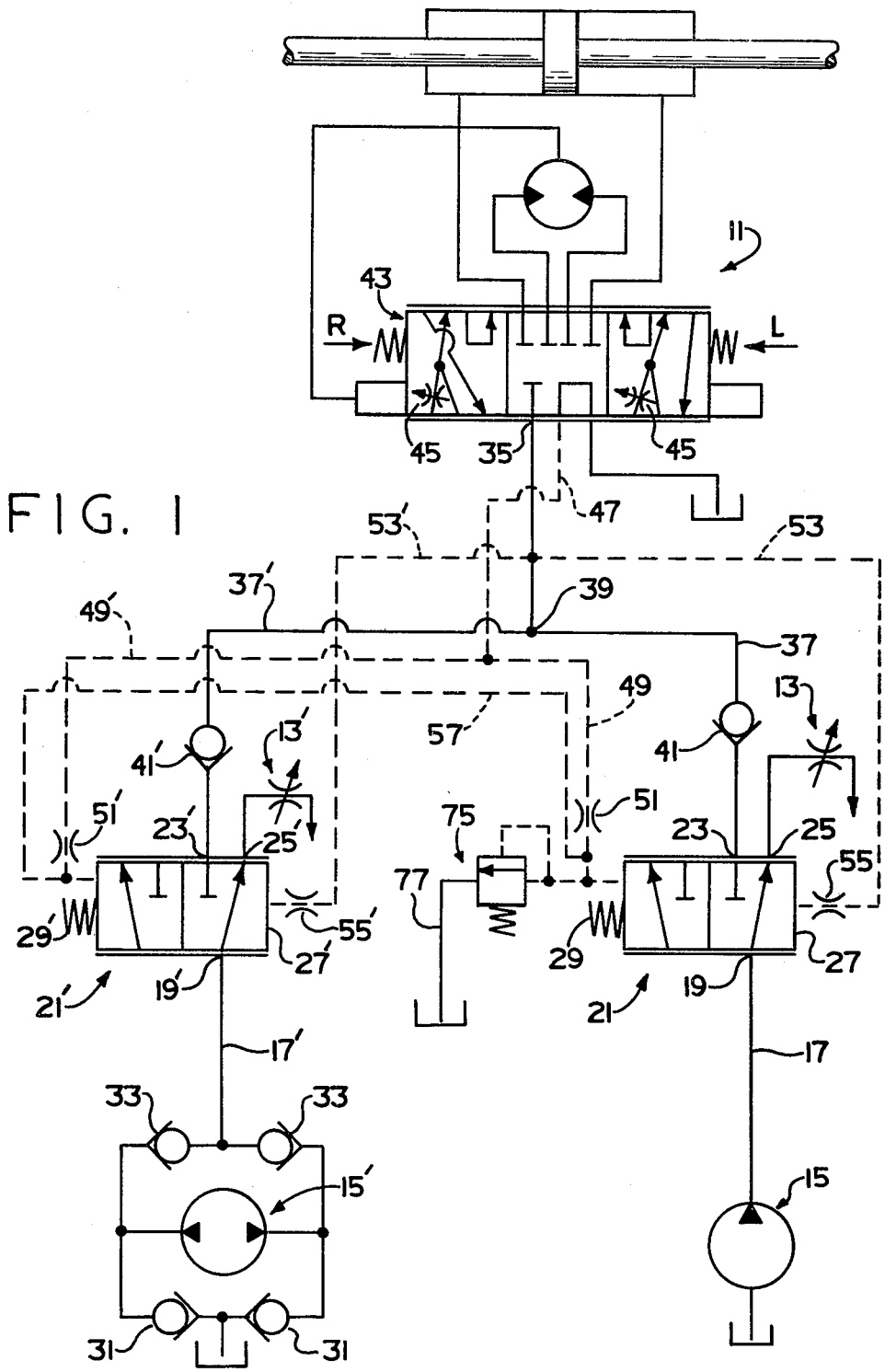
FIG. 1 is a hydraulic schematic of a preferred embodiment of the present invention.

Referring now to the drawings, which are not intended to limit the invention, FIG. 1 illustrates schematically a system for controlling the flow of fluid to a hydrostatic power steering system, generally designated 11, which comprises the "priority" load circuit.

The system also controls the flow of fluid to an auxiliary load circuit, generally designated 13, which for purposes of simplicity is represented by a variable flow control orifice.

The system of the invention may be viewed as comprising a first sub-system and a second sub-system. The first subsystem includes a fluid pump 15, the output of which is fed by means of a conduit 17 to an inlet port 19 of a priority flow control valve, generally designated 21. The flow control valve 21 also includes a priority outlet port 23, an excess flow outlet port 25, a movable valve member 27, and a spring 29 which biases the valve member 27 away from the position shown in FIG. 1, toward a position in which there is substantially unrestricted fluid communication between the inlet port 19 and the priority outlet port 23. It should be appreciated that the priority flow control valve 21 may be of the type well known in the art, such as is illustrated in U.S. Pat. No. 3,455,210, assigned to the assignee of the present invention, and incorporated herein by reference.

The second subsystem is quite similar to the first subsystem just described, and in the second subsystem, like elements bear like numerals, plus a prime (') designation. The second subsystem includes a fluid pump 15' which, in the preferred embodiment, is a ground wheel driven pump, whereas the fluid pump 15 of the first subsystem would typically be driven by the vehicle engine. As mentioned in the background of the present specification, one of the main objects of the second subsystem is to provide emergency steering capability which is operable whenever the vehicle is moving, and steering is required, even if the main, engine driven pump fails to deliver fluid. Because the fluid pump 15' must be reversible, it is provided with an arrangement of suction-side check valves 31 and discharge-side check valves 33 as is well known in the art.

The output of the fluid pump 15' is fed by means of a conduit 17' to an inlet port 19' of a priority flow control valve, generally designated 21'. The flow control valve 21' also includes a priority outlet port 23', an excess flow outlet port 25', a movable valve member 27', and a spring 29' which biases the valve member 27' away from the position shown in FIG. 1, toward a position in which there is substantially unrestricted fluid communication between the inlet port 19' and the priority outlet port 23'.

The excess flow outlet port 25 of the priority valve 21 is in fluid communication with the auxiliary load circuit 13, while the excess flow outlet port 25' of the priority valve 21' is connected to an auxiliary load circuit 13'. It should be understood by those skilled in the art that, for purposes of the present invention, the auxiliary load circuits 13 and 13' could be two independent load circuits, or the excess flow outlet ports 25 and 25' could be connected in parallel to a single auxiliary load circuit. If there are two independent auxiliary load circuits 13 and 13', the load circuit 13' is, in effect, given priority over the load circuit 13, for reasons which will become apparent subsequently.

The priority outlet port 23 is connected to an inlet port 35 of the steering system 11 by means of a fluid conduit 37, and the priority outlet port 23' is connected by means of a fluid conduit 37' to the conduit 37 at a fitting 39. A pair of ball check valves 41 and 41' are disposed in the fluid conduits 37 and 37', upstream from the fitting 39, for the purpose of preventing any backflow in the conduits 37 and 37', respectively.

The hydrostatic power steering system 11 includes a valving arrangement 43 which, when shifted from the neutral position shown in FIG. 1 to either the left turn position (L) or the right turn position (R), defines a main, variable flow control orifice 45. The valving 43, in a manner now well known in the art, provides a load pressure signal, illustrated by signal line 47, taken from downstream of the variable flow control orifice 45. The load pressure signal 47 is communicated by means of a signal line 49 through an orifice 51 to the spring chamber of the flow control valve 21 to bias the valve member 27 in the same direction as does the spring 29, i.e., away from the position shown in FIG. 1. Similarly, the load pressure signal 47 is communicated by means of a signal line 49' through an orifice 51' to the spring chamber of the flow control valve 21' to bias the valve member 27' in the same direction as does the spring 29', i.e., away from the position shown in FIG. 1. From the above description, it should be appreciated that the flow control valves 21 and 21' will be in the positions shown in FIG. 1 only when the valving 43 is shifted to the neutral position of FIG. 1.

A pilot pressure signal is taken from upstream of the variable orifice 45, and preferably, at a point downstream from the fitting 39. The pilot pressure signal is communicated by means of a signal line 53 through an orifice 55 to exert a biasing force on the valve member 27 in opposition to that exerted by the spring 29. Similarly, the pilot pressure signal is communicated by means of a signal line 53' through an orifice 55' to exert a biasing force on the valve member 27' in opposition to that exerted by the spring 29'. Finally, the system includes a signal line 57 which interconnects the signal line 49, downstream of the orifice 51, and the signal line 49', downstream of the orifice 51'. The purpose of this interconnection will be described in connection with the operation of the present invention.

Figure 2:
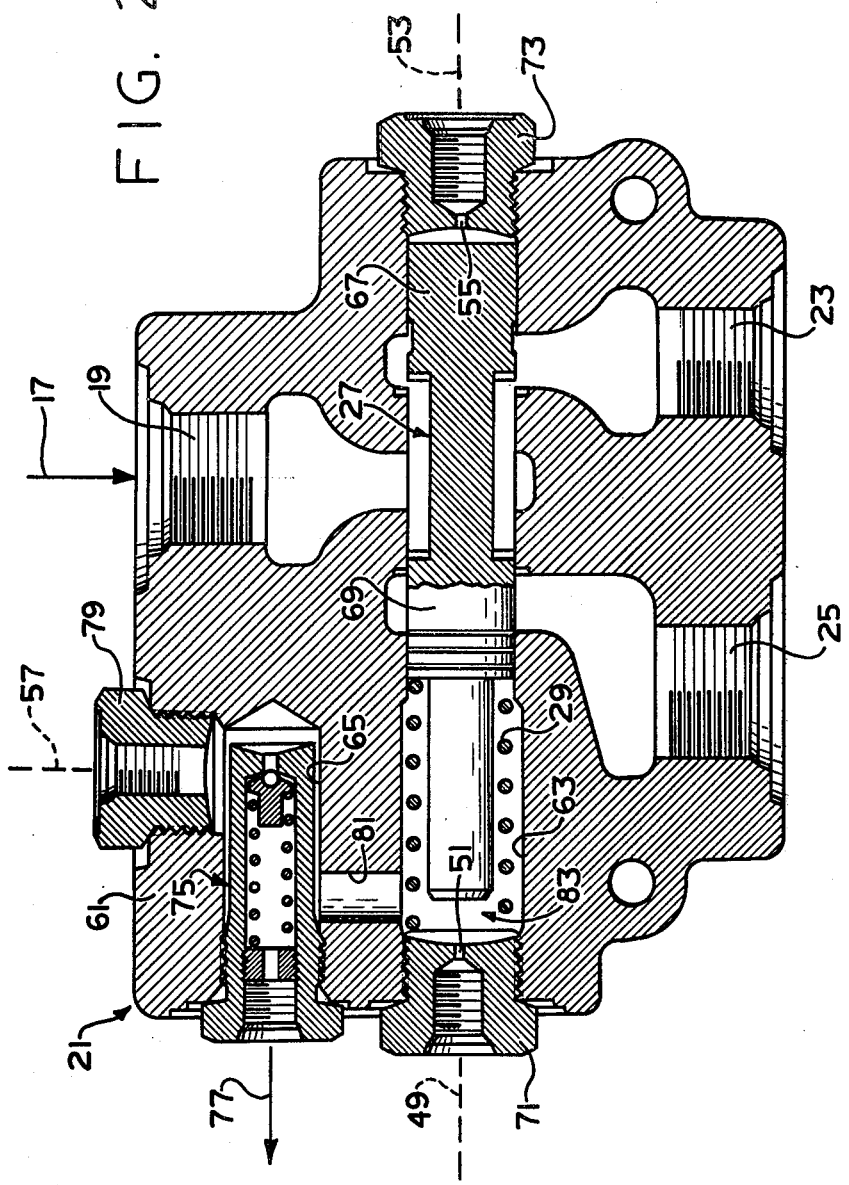
FIG. 2 is a transverse cross section of the priority flow control valve utilized in the system of FIG. 1.

Referring now to FIG. 2, in conjunction with FIG. 1, the subject embodiment of the flow control valve 21 will be described in somewhat greater detail. The priority flow control valve 21 includes a valve housing 61 which defines, in addition to the ports 19, 23, and 25, a main valve bore 63, and a relief bore 65. Disposed within the bore 63 is the valve member 27 which includes a pair of axially spaced lands 67 and 69. Disposed at the left end of the bore 63 is a threaded fitting 71 which receives the signal line 49 and defines the orifice 51. Similarly, at the right end of the bore 63 is a threaded fitting 73 which receives the signal line 53 and defines the orifice 55.

Disposed in the relief bore 65 is a steering system relief valve assembly 75, the outlet of which is communicated by a fluid conduit 77 to the system reservoir. Also in threaded engagement with the valve housing 61 is a fitting 79 which receives the signal line 57 and permits relatively unrestricted fluid communication through the relief bore 65, through a passage 81, and into a load signal chamber 83 defined by the valve bore 63, the fitting 71 and the land 69. Disposed within the signal chamber 83 is the spring 29, which biases the valve member 27 toward the right in FIG. 2.

As was implied in the previous description, the priority flow control valves 21 and 21' may be quite similar, and in fact, may be substantially identical with two exceptions. First, as is shown schematically in FIG. 1, it is not necessary for the valve 21' to include a steering system relief valve, and second, it is a feature of the present invention that the spring 29 exerts a substantially greater biasing force than does the spring 29', for reasons which will be described subsequently.

FIG. 1—Operation

By way of example only, it will be assumed for purposes of the subsequent description that the spring 29 of the flow control valve 21 exerts a biasing force equivalent to a fluid pressure of 150 psi, whereas the spring 29' of the valve 21' exerts a biasing force equivalent to a fluid pressure of 100 psi. For each of the operating modes to be described, it will be assumed that the power steering system 11 is being subjected to a steering load of such magnitude that the load pressure signal 47 is 1000 psi, and a fluid pressure of 1000 psi is present in the spring chambers of the valves 21 and 21'.

In a first operating mode, the engine driven fluid pump 15 is able to supply sufficient fluid to meet the flow demand of the steering system 11, either because the engine speed is high enough that the flow output of the pump is relatively high, or the fluid flow rate demanded by the steering system is relatively low. In this mode, because the biasing force of the spring 29 is 150 psi, the flow control valve 21 will provide a sufficient flow of fluid from the inlet port 19 to the priority outlet port 23, and then to the inlet port 35 of the steering system 11 to maintain a pressure drop of 150 psi across the main variable flow control orifice 45. In other words, as long as the pressure downstream of the orifice 45, and in the signal line 47, is 1000 psi, the fluid pressure in the conduit 37 and in the signal line 53 will be 1150 psi. As is now well known in the art, if the output of the pump 15 is greater than is needed to maintain the 150 psi pressure drop across orifice 45, the pressure in signal line 53 will tend to increase, which will bias the valve member 27 to the left in FIG. 2 to throttle slightly the flow of fluid from the inlet port 19 to the priority outlet port 23, while increasing flow from the inlet port 19 to the excess flow outlet port 25.

At the same time, the ground wheel driven pump 15' provides fluid to the flow control valve 21'. As mentioned previously, the load signal pressure of 1000 psi is communicated from the load signal line 47 through the signal line 49' and into the spring chamber of the valve 21', while the fluid pressure of 1150 psi in the conduit 37 is communicated through the signal line 53' to bias the valve member 27' to the left in FIG. 1. Because the spring 29' exerts a biasing force of only 100 psi, the net biasing force on the valve member 27 is 50 psi to the left in FIG. 1, and the position of the valve member 27' blocks fluid communication from the inlet port 19' to the priority outlet port 23' while permitting substantially unrestricted fluid communication to the excess flow outlet port 25'. Thus, in the first mode, the entire output of the pump 15' is communicated to the auxiliary load circuit 13', while the entire flow requirement of the steering system is supplied by the pump 15.

In a second operating mode, the fluid output of the pump 15 is no longer sufficient to meet the demand of the steering system 11, either because the engine speed and pump output are now relatively lower, or because the need for steering flow is now relatively greater. In this operating mode, the pump 15 is no longer able to provide enough fluid flow through the conduit 37 to maintain a pressure of 1150 psi therein, and a pressure drop of 150 psi across the orifice 45. It should be appreciated that as the pressure drop across the orifice 45 decreases below 150 psi, the spring 29 biases the valve member 27 to the extreme right in FIGS. 1 and 2, blocking communication from the inlet port 19 to the excess flow port 25, while permitting unrestricted communication to the priority outlet port 23.

Assuming now that the output of the pump 15 becomes less and less able to meet the demand of the steering system 11, the pressure differential across the orifice 45 continues to decrease until it reaches 100 psi. At this point, the pressure in the signal line 49' is still 1000 psi, but now the pressure in the signal line 53' is only 1100 psi, and the 100 psi biasing force of the spring 29' is able to move the valve member 27' from the extreme lefthand position shown in FIG. 1 toward the righthand position. As a result, a sufficient amount of fluid is communicated from the inlet port 19' to the priority outlet port 23', and through the conduit 37' to the conduit 37 to maintain a pressure differential of 100 psi across the orifice 45. It should be understood that when the pressure differential across the orifice 45 drops from 150 psi in the first mode to 100 psi in the second mode, there will occur a related decrease in the fluid flow rate through the orifice 45, for any particular orifice area, as determined by the rate of rotation of the vehicle steering wheel (not shown).

As was mentioned previously in connection with FIG. 1, a signal line 57 interconnects the signal lines 49 and 49' downstream of the orifices 51 and 51', respectively. This interconnection is provided primarily to facilitate draining the load signal chamber of the flow control valve 21' when the steering system 11 is being operated against the steering stops, causing the load pressure in the signal lines 47, 49, and 49' to indicate substantially increased steering load. In this condition, the steering system relief valve 75 relieves the fluid pressure in the chamber 83 of the valve 21. However, if it were not for the interconnecting signal line 57, the orifices 51 and 51' would restrict drainage of the signal chamber in the valve 21', moving the valve member 27' to a position causing the pump 15' to build fluid pressure, rather than being able to freely communicate with the auxiliary load circuit 13'.

Thus, the present invention provides a system for controlling the flow of fluid to a priority load circuit and to at least one auxiliary load circuit which makes it possible for the main, engine driven pump to be sized smaller, with a second fluid source providing additional pressurized fluid only as needed. In addition, the present invention results in a system which is especially suited to provide emergency steering capability, i.e., the second fluid source provides pressurized fluid under emergency conditions in the event of a failure of the primary, engine driven pump 15. If the pump 15' is a ground wheel driven pump, the system of FIG. 1 provides an especially reliable emergency steering system because the pump 15' is constantly operating, rather than being idle for extended periods of time as is the backup fluid source in many so called "emergency" steering systems known in the prior art.

As one obvious alternative embodiment of the system of FIG. 1, the steering system pilot relief valve 75 may be included in the flow control valve 21', rather than in the flow control valve 21, in which case the signal line 49' may be eliminated, and the signal line 57 connected to the load signal chamber 83, through the orifice 51'. In another modification of the system of FIG. 1, one of the excess flow ports 25 or 25' could be connected to the system reservoir, rather than to an auxiliary load circuit, 13 or 13'. Preferably, the excess flow port 25' of the flow control valve 21' would be the one connected to the reservoir such that, during normal operation of the system, there would be practically no load on the ground wheel driven pump 15'.

FIG. 3

Figure 3:
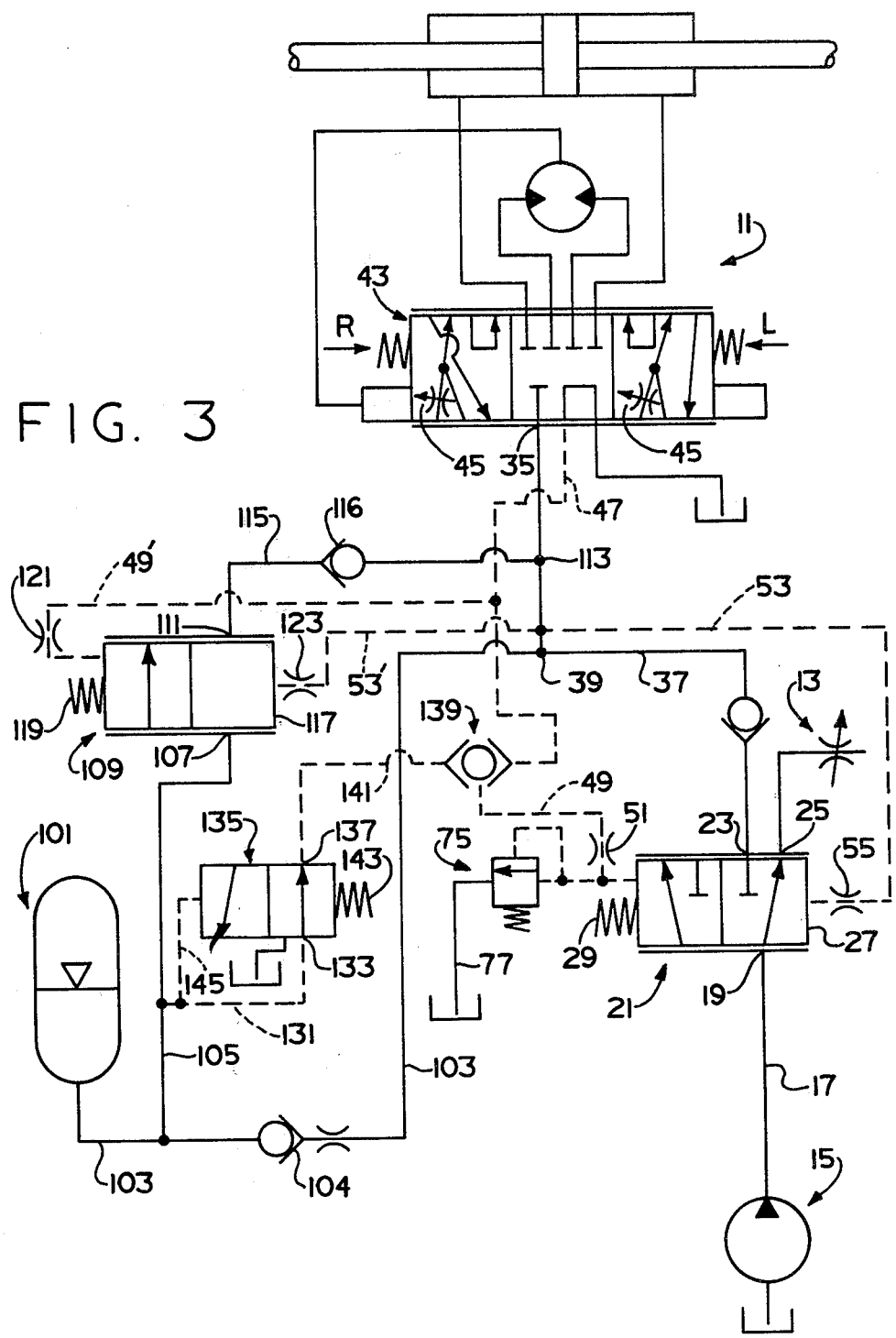
FIG. 3 is a hydraulic schematic of an alternative embodiment of the present invention utilizing an accumulator as the second fluid source.

Referring now to FIG. 3, there is illustrated an alternative embodiment of the present invention in which elements which are the same as in the FIG. 1 embodiment bear the same numerals, and new elements bear numerals in excess of 100.

In the FIG. 3 embodiment, the second fluid source comprises an accumulator 101 which, within the scope of the present invention, may be any well known type of fluid pressure storage device. The accumulator 101 is connected by means of a fluid conduit 103 to the fluid conduit 37, at the fitting 39, and a check valve 104 is disposed in the conduit 103. Connected to the fluid conduit 103 is a fluid conduit 105 which, in turn, is connected to an inlet port 107 of a pressure reducing valve, generally designated 109. The valve 109 includes a single outlet port 111 which is connected to the fluid conduit 37, downstream of the fitting 39 at a fitting 113 through a fluid conduit 115, which includes a check valve 116. The pressure reducing valve 109 further includes a movable valve member 117 which is biased toward the right in FIG. 3 by a spring 119. The load pressure signal 47 is communicated by means of the signal line 49' through an orifice 121 to the spring chamber of the valve 109 to bias the valve member 117 in the same direction as does the spring 119, i.e., toward a position permitting relatively unrestricted fluid communication from the inlet port 107 to the outlet port 111. The pilot pressure signal is communicated from the fluid conduit 37 by means of the signal line 53' through an orifice 123 to exert a biasing force on the valve member 117 in opposition to that exerted by the spring 119, i.e., toward a position preventing fluid communication from the inlet port 107 to the outlet port 111.

In fluid communication with the fluid conduit 105, by means of a signal line 131, is an inlet port 133 of a load signal control valve 135, having an outlet port 137 connected to one inlet of a shuttle valve 139 by means of a signal line 141. The other inlet of the shuttle valve 139 is connected to the load pressure signal line 47, while the outlet of the shuttle valve 139 is connected to the signal line 49. The load signal control valve 135 is biased by a spring 143 toward the position shown in FIG. 3, permitting communication between the inlet port 133 and the outlet port 137. At the same time, the fluid pressure in the signal line 131 is communicated by means of a signal line 145 to exert a biasing force on the control valve 135 in opposition to that exerted by the spring 143.

FIG. 3—Operation

In describing the operation of the FIG. 3 embodiment, assumptions will be made similar to those made in connection with FIG. 1, i.e., the spring 29 of the control valve 21 exerts a biasing force equivalent to a fluid pressure of 150 psi, the spring 119 of the pressure reducing valve 109 exerts a biasing force equivalent to a fluid pressure of 100 psi, the steering load is such that the load pressure signal 47 is 1000 psi, and a fluid pressure of 1000 psi is present in the spring chambers of the valves 21 and 109.

In a first operating mode, the pump 15 is able to supply sufficient fluid to maintain a pressure drop of 150 psi across the variable orifice 45, as was described in connection with FIG. 1. Thus, the fluid pressure in the signal lines 53 and 53' will be 1150 psi. Because the spring 119 exerts a biasing force of only 100 psi, the net biasing force on the valve member 117 is 50 psi to the left in FIG. 3, and the valve member 117 blocks fluid communication from the inlet port 107 to the outlet port 111. Thus, in the first mode, the entire flow requirement of the steering system is supplied by the pump 15.

It is during operation in the first mode that the accumulator 101 is charged, in order that it will be capable of supplying pressurized fluid when it is subsequently needed, e.g., during an emergency steering condition. By way of example only, the spring 143 has been selected to maintain the fluid pressure in the accumulator 101 in the range of about 2000 psi to about 2200 psi. If the fluid pressure in the accumulator 101 is below 2000 psi, the spring 143 biases the load signal control valve 135 to the position shown in FIG. 3, such that the pressure in the accumulator 101 is communicated by signal lines 131 and 141 to the shuttle valve 139, then through the signal line 49 to the spring chamber of the flow control valve 21, indicating a need for increased fluid pressure at the priority outlet 23. When the fluid pressure in the accumulator 101 reaches about 2200 psi, the control valve 135 shifts to the right in FIG. 3, interrupting the communication of the signal line 131, and draining the signal line 141 to tank. In this manner, the accumulator 101 is charged, either during the first mode of operation, or when the steering system 11 is in neutral.

In a second operating mode, when the pump 15 is no longer able to provide enough fluid flow through the conduit 37 to maintain a pressure differential of 150 psi across the orifice 45, the pressure differential across the orifice 45 begins to drop below 150 psi, as was described in connection with FIG. 1. When the pressure differential across the orifice 45 has decreased to the point at which it is only 100 psi, the pressure in the signal line 53' is only 1100 psi, and the 100 psi biasing force of the spring 119 is now able to move the valve member 117 from the extreme lefthand position shown in FIG. 3 toward the righthand position. As a result, a sufficient amount of fluid is communicated from the accumulator 101, through the fluid conduit 105, then from the inlet port 107 to the outlet port 111, and through the conduit 115 to the conduit 37 to maintain a pressure differential of 100 psi across the orifice 45. As indicated in connection with FIG. 1, when the pressure differential across the orifice 45 drops from 150 psi in the first mode to 100 psi in the second mode, the fluid flow rate through the orifice 45 may decrease, unless the area of the orifice 45 is increased.

It should be noted that in the FIG. 3 embodiment, when the steering system 11 is not operating, but the accumulator 101 is being charged as described previously, the inlet port 35 of the steering system 11 is subjected to a fluid pressure of approximately 2000 psi. Depending upon the characteristics of the steering system 11, this relatively high fluid pressure at the inlet port 35 may cause undesirable leakage through the valving of the steering system 11. If such is the case, it may be more desirable to use the system shown in FIG. 4 in which the inlet port of the steering system 11 is not subjected to the fluid pressure used to charge the accumulator, but which is somewhat more complicated than the system of FIG. 3.

FIG. 4

Figure 4:
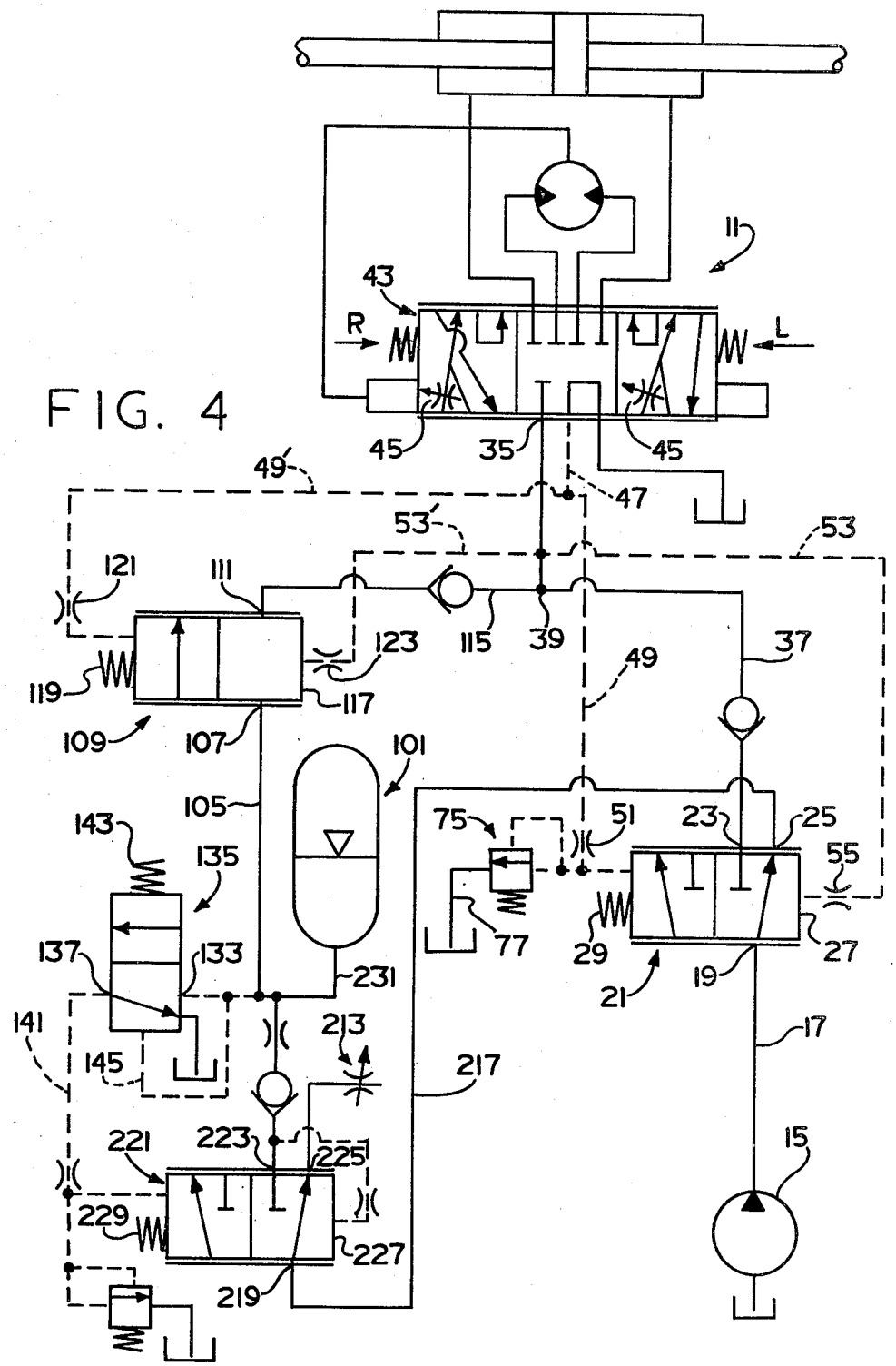
FIG. 4 is a hydraulic schematic of another alternative embodiment of the invention, also using an accumulator as the second fluid source.

Referring now to FIG. 4, there is illustrated another alternative embodiment of the present invention in which elements which are the same as in the FIGS. 1 and 3 embodiments bear the same numerals, and new elements bear numerals in excess of 200.

In the FIG. 4 embodiment, the excess flow outlet port 25 of the flow control valve 21 is connected by means of a fluid conduit 217 to an inlet port 219 of a priority flow control valve 221. The flow control valve 221 may be substantially identical to the flow control valve 21, including a priority outlet port 223, an excess flow outlet port 225, a movable valve member 227, and a spring 229 which biases the valve member 227 away from the position shown in FIG. 4, toward a position in which there is substantially unrestricted fluid communication between the inlet port 219 and the priority outlet port 223. The excess flow outlet port 225 is in fluid communication with an auxiliary load circuit 213, while the priority outlet port 223 is connected to the accumulator 101 by means of a fluid conduit 231. The fluid conduit 231 is connected to the pressure reducing valve 109 by means of the fluid conduit 105, as was described in connection with FIG. 3. In addition, the load signal control valve 135 is connected to the fluid conduit 105 in the same manner as in FIG. 3. The signal line 141 is connected to the spring chamber of the flow control valve 221.

FIG. 4—Operation

In describing the operation of the FIG. 4 embodiment, the same assumptions will be made with regard to the springs 29 and 119 and the load pressure signal 47, as were made in connection with FIG. 3.

In a first operating mode, the pump is able to supply sufficient fluid to maintain a pressure drop of 150 psi across the variable orifice 45, as was described in connection with FIG. 3. Thus, the fluid pressure in the signal lines 53 and 53' will be 1150 psi, and the valve member 117 blocks fluid communication from the inlet port 107 to the outlet port 111. Thus, in the first mode, the entire flow requirement of the steering system is supplied by the pump 15.

During operation in the first mode, whenever the fluid output of the pump 15 is more than sufficient to maintain the 150 psi pressure differential across the orifice 45, the pressure in the fluid conduit 37 tends to become greater than 1150 psi, and the resulting pressure in the signal line 53 biases the valve member 27 away from the extreme righthand position, somewhat toward the lefthand position shown in FIG. 4. When this occurs, some of the fluid entering the inlet port 19 flows to the excess flow outlet port 25, and through the fluid conduit 217 to the inlet port 219 of the control valve 221.

If the fluid pressure in the accumulator 101 is below the predetermined minimum (e.g., 2000 psi), the spring 143 biases the load signal control valve 135 to the downward position, and the pressure in the conduit 231 is communicated from the inlet port 133 to the outlet port 137, then through the signal line 141 to the spring chamber of the control valve 221, biasing the valve member 227 toward its righthand position, in which there is substantially unrestricted fluid communication from the inlet port 219 to the priority flow outlet port 223. Thus, all excess flow from the control valve 21 may be used to charge the accumulator 101, until it reaches the predetermined pressure level. When the fluid pressure in the accumulator 101 has reached 2200 psi, the pressure in the signal line 145 overcomes the spring 143 and biases the control valve 135 to the position shown in FIG. 4, interrupting communication of the inlet port 133 to the outlet port 137, and draining the signal line 141 to tank. When the signal line 141 is drained, the valve member 227 moves toward the position shown in FIG. 4, in which there is substantially unrestricted fluid communication from the inlet port 219 to the excess flow outlet port 225, and flow to the priority outlet port 223 is blocked. Therefore, when the accumulator 101 is fully charged, all flow to the priority flow control valve 221 is available for the auxiliary load circuit 213.

In a second operating mode, when the pump 15 is no longer able to provide enough fluid flow through the conduit 37 to maintain the pressure differential of 150 psi across the orifice 45, the pressure drop across the orifice 45 begins to drop below 150 psi, as was described in connection with FIGS. 1 and 3. When the pressure differential across the orifice 45 has decreased to the point at which it is only 100 psi, the pressure in the signal line 53' is only 1100 psi, and the 100 psi biasing force of the spring 119 is now able to move the valve member 117 from the extreme lefthand position shown in FIG. 4 toward the righthand position. As a result, a sufficient amount of fluid is communicated from the accumulator 101, through the fluid conduit 105, then from the inlet port 107 to the outlet port 111, and through the conduit 115 to the conduit 37 to maintain a pressure differential of 100 psi across the orifice 45. Thus, the embodiment of FIG. 4 provides an emergency steering system in which the inlet port 35 of the steering system 11 is not subjected to the fluid pressure used to charge the accumulator.

It should be apparent to those skilled in the art that certain obvious alterations and modifications may be made in the preferred embodiments, and it is intended to include all such alterations and modifications as a part of the present invention, insofar as they come within the scope of the appended claims.

What is claimed is:

1. A system for controlling the flow of fluid from first and second fluid sources to a priority load circuit and to an auxiliary load circuit means, the priority load circuit including means defining a main, variable flow control orifice, and being normally operable with a predetermined pressure differential X across the variable flow control orifice, the priority load circuit including means providing load pressure signal means representative of the demand for fluid flow by the priority load circuit, said system comprising:

(a) first flow control valve means including an inlet port in fluid communication with the first fluid source, a priority outlet port in fluid communication with the priority load circuit, an excess flow outlet port in fluid communication with the auxiliary load circuit means, a movable valve member movable between one position permitting substantially unrestricted fluid communication from said inlet port to said priority outlet port, and another position permitting substantially unrestricted fluid communication from said inlet port to said excess flow outlet port, means biasing said movable valve member toward said one position, said biasing means exerting a biasing force equivalent to said pressure differential X, and said movable valve member being biased toward said another position by said load pressure signal means;

(b) second flow control valve means including an inlet port in fluid communication with the second fluid source, a priority outlet port in fluid communication with the priority load circuit, a movable valve member movable between one position permitting substantially unrestricted fluid communication between said inlet port and said priority outlet port, and another position substantially preventing fluid communication from said inlet port to said priority outlet port, means biasing said movable valve member toward said one position, said biasing means exerting a biasing force equivalent to a pressure differential Y, and said movable valve member being biased toward said another position by said load pressure signal means; and (c) said pressure differential Y being less than said pressure differential X whereby:

(i) when the fluid delivery of the first fluid source is sufficient to maintain said pressure differential X across the main variable flow control orifice, the movable valve member of said second flow control valve means is in said another position, and all fluid required by said priority load circuit is supplied by the first fluid source, through said first flow control valve means; and (ii) when the fluid delivery of the first fluid source is insufficient to maintain the pressure differential X across the main variable flow control orifice, the differential across the main variable flow control orifice is reduced to the pressure differential Y, the movable valve member of said first flow control valve means is in said one position, the entire fluid delivery of the first fluid source flows to the priority load circuit, and the movable valve member of said second flow control valve means is biased away from said another position to permit a sufficient flow of fluid from the second fluid source to the priority load circuit to maintain said pressure differential Y across the main variable flow control orifice.

2. A system for controlling the flow of fluid from first and second fluid sources to a priority load circuit and to an auxiliary load circuit means, the priority load circuit including means defining a main, variable flow control orifice, means providing a pilot pressure signal from upstream of said variable flow control orifice, and means providing a load pressure signal from downstream of said variable flow control orifice, the priority load circuit being normally operable in response to a pressure differential X between said pilot pressure signal and said load pressure signal, said system comprising:

(a) first flow control valve means including an inlet port in fluid communication with the first fluid source, a priority outlet port in fluid communication with the priority load circuit, an excess flow outlet port in fluid communication with the auxiliary load circuit means, a movable valve member movable between one position permitting substantially unrestricted fluid communication from said inlet port to said priority outlet port, and another position permitting substantially unrestricted fluid communication from said inlet port to said excess flow outlet port, and said movable valve member being biased toward said one position by said load signal pressure, and by a biasing means exerting a biasing force equivalent to said pressure differential X, said movable valve member being biased toward said another position by said pilot pressure signal;

(b) second flow control valve means including an inlet port in fluid communication with the second fluid source, a priority outlet port in fluid communication with the priority load circuit, a movable valve member movable between one position permitting substantially unrestricted fluid communication between said inlet port and said priority outlet port, and another position substantially preventing fluid communication from said inlet port to said priority outlet port, said movable valve member being biased toward said one position by said load pressure signal and a biasing means exerting a biasing force equivalent to a pressure differential Y, said movable valve member being biased toward said another position by said pilot pressure signal; and (c) said pressure differential Y being less than said pressure differential X whereby:

(i) when the fluid delivery of the first fluid source is sufficient to maintain said pressure differential X between said pilot pressure signal and said load pressure signal, the movable valve member of said second flow control valve means is in said another position, and all fluid required by said priority load circuit is supplied by the first fluid source, through said first flow control valve means; and (ii) when the fluid delivery of the first fluid source is insufficient to maintain the pressure differential X between said pilot pressure signal and said load pressure signal, the pressure differential therebetween is reduced to said pressure differential Y, the movable valve member of said first flow control valve means is in said one position, the entire fluid delivery of the first fluid source flows to the priority load circuit, and the movable valve member of said second flow control valve means is biased away from said another position to permit a sufficient flow of fluid from the second fluid source to the priority load circuit to maintain said pressure differential Y across the main variable flow control orifice.

3. A system as claimed in claim 1 or 2 wherein said second flow control valve means includes an excess flow outlet port in fluid communication with the auxiliary load circuit means, said another position of said movable valve member permitting substantially unrestricted fluid communication from said inlet port to said excess flow outlet port.

4. A system as claimed in claim 1 or 2 wherein the second fluid source comprises fluid pressure accumulator means.

5. A system as claimed in claim 4 wherein said accumulator means is in fluid communication with said priority outlet port of said first flow control valve means.

6. A system as claimed in claim 4 wherein said accumulator means is in fluid communication with said excess flow outlet port of said first flow control valve means.

7. A system as claimed in claim 6 including a third flow control valve means including an inlet port in fluid communication with said excess flow outlet port of said first flow control valve means, a priority outlet port in fluid communication with said inlet port of said second flow control valve means, and an excess flow outlet port in fluid communication with the auxiliary load circuit means.

8. A system as claimed in claim 7 wherein said third flow control valve means further includes a movable valve member movable between one position permitting substantially unrestricted fluid communication from said inlet port to said priority outlet port, and another position permitting substantially unrestricted fluid communication from said inlet port to said excess flow outlet port.

9. A system as claimed in claim 8 wherein said movable valve member of said third flow control valve means is biased toward said one position by a fluid pressure signal representative of the need for fluid to charge said accumulator means.

10. A system as claimed in claim 1 or 2 wherein said second flow control valve means includes an excess flow outlet port, said another position of said movable valve member permitting substantially unrestricted fluid communication from said inlet port to said excess flow outlet port.

11. A system as claimed in claim 10 wherein the second fluid source comprises a ground wheel driven pump.

* * * * *